US005664747A

United States Patent [19]

Eilering

[11] Patent Number: 5,664,747
[45] Date of Patent: Sep. 9, 1997

[54] ADJUSTABLE SUPPORT DEVICE

[75] Inventor: Johannes Hermanus Eilering, Groningen, Netherlands

[73] Assignee: Paul Andre Bekker, Haren, Netherlands

[21] Appl. No.: 232,153

[22] PCT Filed: Nov. 11, 1992

[86] PCT No.: PCT/NL92/00200

§ 371 Date: Jul. 8, 1994

§ 102(e) Date: Jul. 8, 1994

[87] PCT Pub. No.: WO93/10396

PCT Pub. Date: May 27, 1993

[30] Foreign Application Priority Data

Nov. 14, 1991 [NL] Netherlands .................. 9101899

[51] Int. Cl.⁶ ............................................ E16H 11/00
[52] U.S. Cl. .............................. 248/123.11; 248/123.2
[58] Field of Search ........................... 248/123.1, 162.1, 248/280.1, 292.1, 297.1, 325, 331, 364, 123.2; 362/401, 402, 403, 410, 414

[56] References Cited

U.S. PATENT DOCUMENTS

| 364,470 | 6/1887 | Blake | 248/123.2 |
| 684,166 | 10/1901 | Baker | 248/364 X |
| 1,233,601 | 7/1917 | Pieper | 248/331 X |
| 2,103,013 | 12/1937 | Nirdlinger | 248/123.1 |
| 2,156,862 | 5/1939 | Maugard | 248/123.2 |
| 2,459,722 | 1/1949 | Price | 248/123.2 |
| 3,783,262 | 1/1974 | Pile | 248/123.2 X |
| 3,790,773 | 2/1974 | Sapper | 248/123.2 X |
| 4,671,478 | 6/1987 | Schoenig et al. | 288/123.2 X |
| 5,001,617 | 3/1991 | Chan | 362/401 |

FOREIGN PATENT DOCUMENTS

| 70434 | 1/1983 | European Pat. Off. |
| 358889 | 3/1990 | European Pat. Off. |
| 8603797 | 7/1986 | Germany . |
| 487571 | of 1953 | Italy | 248/123 |
| 221183 | 12/1924 | United Kingdom . |

Primary Examiner—Leslie A. Braun
Assistant Examiner—Kimberly T. Wood
Attorney, Agent, or Firm—Birch, Stewart, Kolasch & Birch, LLP

[57] ABSTRACT

An adjustable support device can position a body such as a light fitting. This support device comprises an adjustable arm supported at a tilting point. The arm is connected on either side of the tilting point. A counterweight is attached to the arm through a holder. A mass in the holder is freely displacable such that the center of gravity of the support device lies beneath the tilting point in any position of the arm. The arm can be flexible and the holder can have an at least partially oval shape in longitudinal section. A concave part can be formed on the arm. This concave part can be engaged by a wheel on a stand in order to support the arm and body.

19 Claims, 5 Drawing Sheets

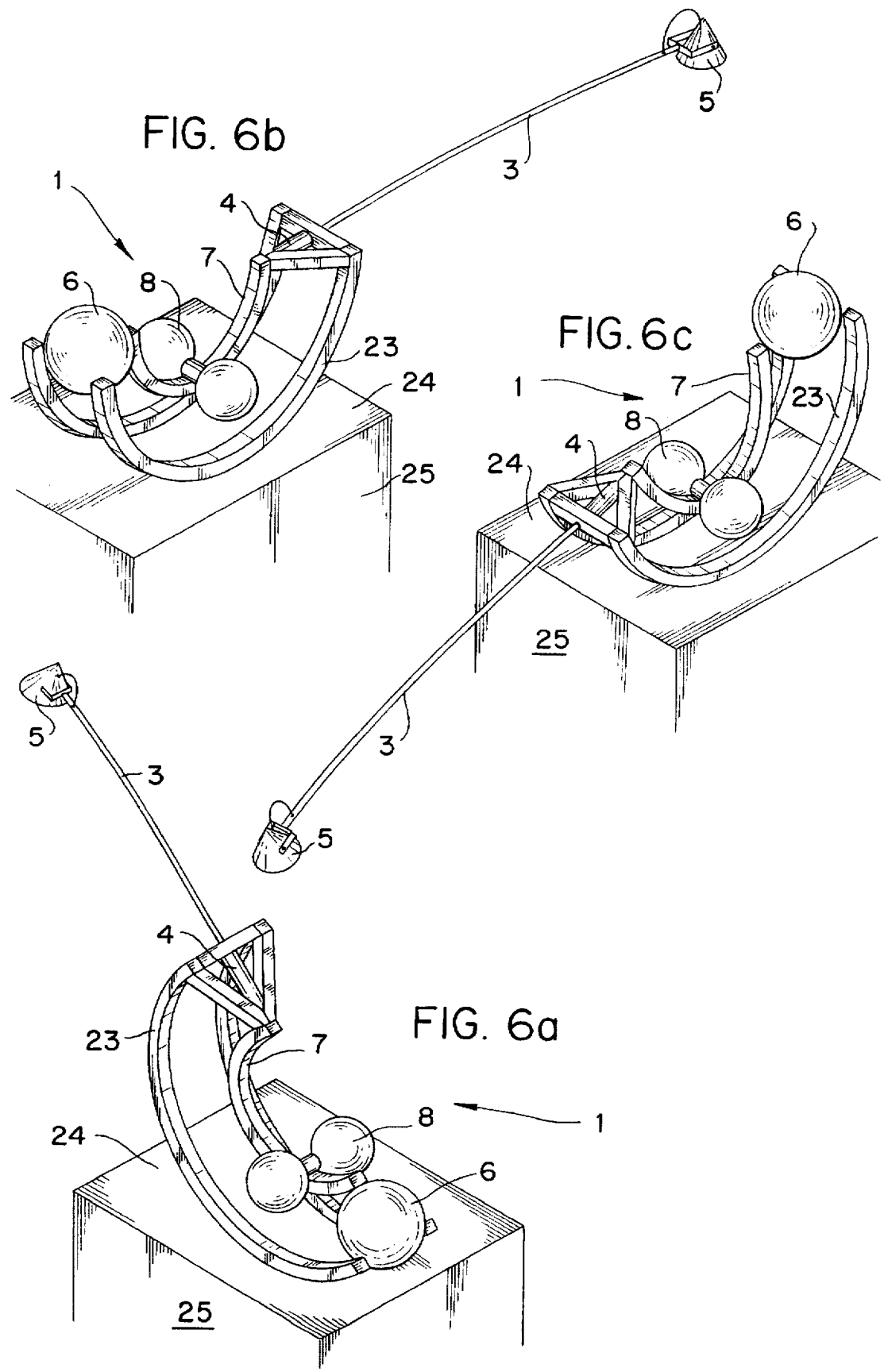

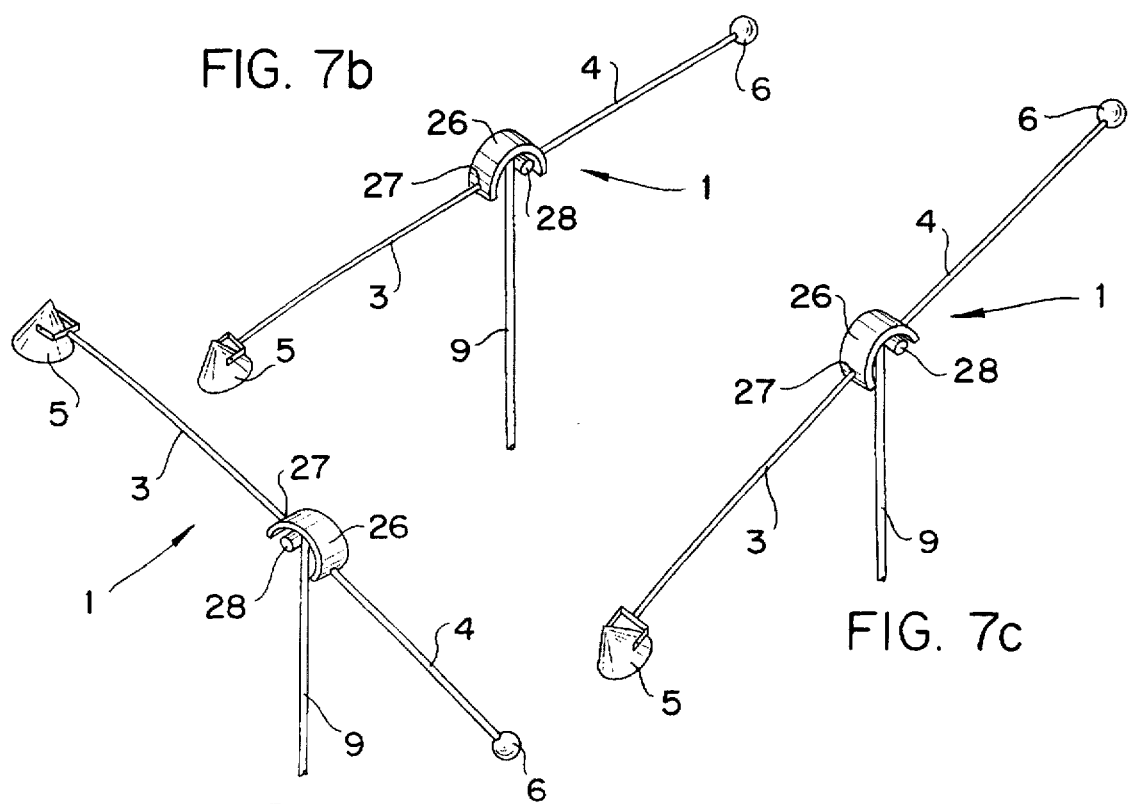
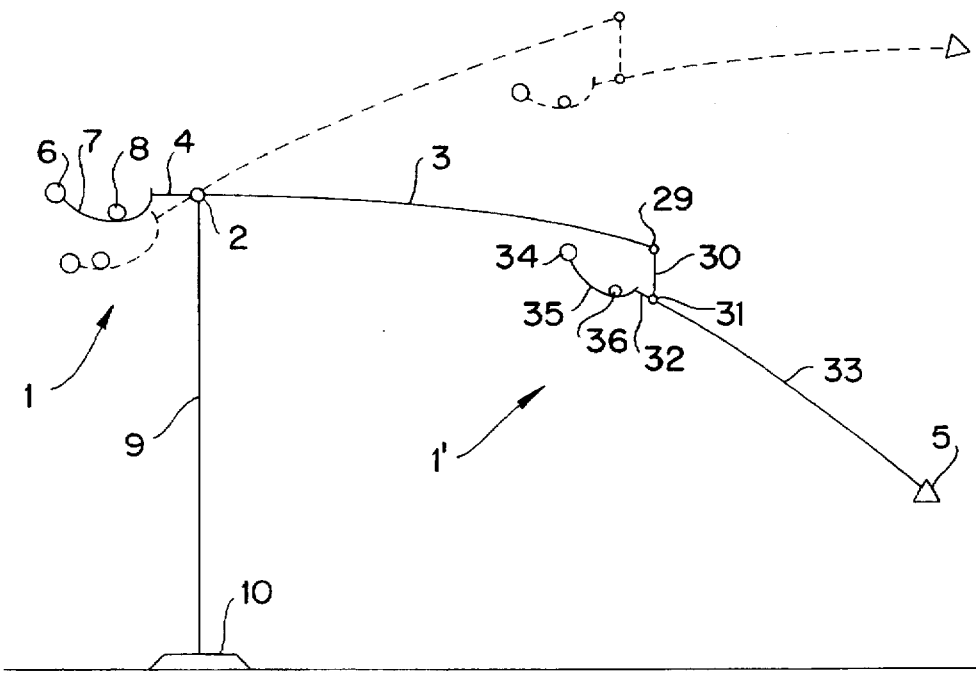

ADJUSTABLE SUPPORT DEVICE

FIELD OF THE INVENTION

The invention relates to an adjustable support device with a body for positioning, for example a light fitting, comprising an adjustable arm supported in a tilting point, to which arm the body for positioning and a counterweight are connected on either side of the tilting point.

1. Description of Background Art

Such a support construction is known from the German Gebrauchsmuster G 88 16 029. In the known support device a rigid arm is disposed from tilting around a shaft, which shaft is horizontally clamped between two vertically standing parts. On one side of the arm relative to the tilting point is fixed a lamp holder, on the other side a counterweight is suspended using a cable, at a location such that both parts tilting point at any possible adjusted position of the arm.

With a change of the adjusted position of the arm, that is, with a change of the angle between the arm and the vertically standing parts, the horizontal distance of the counterweight to the vertically standing parts also changes. Because changing this latter distance is only possible to a limited degree, the range within which the arm can be adjusted is also limited.

2. Summary of the Invention

The object of the invention is to provide an adjustable support device not possessing this limitation.

The objective is also to provide a support arm which can be embodied in light, in particular flexible, materials.

This object is achieved according to the invention with a support device the counterweight of which comprises at least one holder in which at least one mass is received for free movement such that the center of gravity of the support device and the tilting point lie on a vertical line in any position of the arm.

With such a support construction, it is possible to vary the angle between the adjusting arm and the normal from 0° to 180°.

In an embodiment the arm is rigid and in a vertical longitudinal section, the holder comprises at least partially a circular arc.

In an equilibrium situation in such a support device, the mass lies in the holder in the lowest point thereof. When the position of the arm is now changed, the mass moves in the holder along the arc until the lowest point is again reached and the arm is again balanced.

Depending on the material used for the arm and the ratio between length and section of the arm, the arm can be considered as either rigid or flexible. It is not possible to embody a flexible arm in the known manner such that the arm is in balance at each angle of the arm to the normal. The cause of this is the bending of the arm under the influence of gravity on the mass of the body for positioning and on the individual mass of the arm. As a result of this deflection, the distance of the body for positioning to the tilting point changes in the absolute sense, as a result of which in a balanced system the point of suspension of a counterweight would also have to be changed.

In a following embodiment of a support device in accordance with the invention, the arm consists at least partially of flexible material and in longitudinal section the holder has at least partially an egg shape, wherein the head of the egg is outwardly oriented.

It has been found that in such a support device, the moments of the forces which are applied to the body for positioning and the counterweight relative to the tilting point are always equal to each other. By changing the angle between the arm and the normal, the bending of the flexible arm changes, and therefore also the absolute value of the distance of the body for positioning to the tilting point changes. The change in the moment of the gravity applied to the body relative to the tilting point which accompanies this change cannot then be compensated by the movement of a freely displaceable mass along a circular path. This change of the moment of the force can however be compensated when the mass in the holder of the counterweight is freely movable along a path which is ovoid in longitudinal section, wherein the blunt side of the egg is directed towards the tilting point. The requirement of an ovoid path is based on the insight that a flexible, elastically bendable arm can be balanced at each adjustment angle with a fixed counterweight at an unambiguously fixed distance from the tilting point. The correct form of the ovoid longitudinal section of the holder is empirically determined by determining the position of a counterweight freely displaceable along a rigid counter arm for all, or at least a large number of, adjustment angles of the flexible arm.

In a preferred embodiment the center of gravity of the support device in each position of the arm lies below the tilting point.

A support device according to this preferred embodiment is always in a stable balance.

The mass freely displaceable in the holder is, by way of example, circular in vertical cross-section. The displacement of the mass (a ball or a cylinder) in the holder is then realized in simple manner by the rolling of the mass in the holder. In a following embodiment, the mass comprises at least one wheel movable in the holder and a load supported by that wheel.

The center of gravity in such a support device can be lowered by suspending the load from the wheel at some distance below the wheel. A low-lying center of gravity furthers the stability of a support device with a balanced arm.

The stability of the support device can be increased further when the mass is provided with means which increase the friction coefficient between the mass and the holder. With an increased friction coefficient between the mass and the holder, swinging movements of the arm around an adjusted equilibrium point are damped.

A damping of swinging movements is obtained for example when the mass comprises a liquid or when the mass comprises a fine-grained solid material, in particular sand.

The stability of a balanced support arm can likewise be increased when the holder is provided with means which increase the friction coefficient between the mass and the holder.

A support device according to the invention is likewise realized in an embodiment wherein the holder comprises a tube which in vertical longitudinal section comprises two substantially mutually parallel walls and the mass consists of a liquid enclosed by these walls.

In the above discussed embodiments, the position of the tilting point does not change as the adjustment of the arm changes. The arm is then supported in the tilting point by, for example a stand disposed on a ground surface or by a suspension device fixed to an upper surface.

The tilting point is displaced in horizontal direction during a change in the position of the arm in an embodiment wherein the tilting point coincides with the point of contact of a horizontal tangent with a base which in longitudinal direction is at least partly circular in section and which is connected to the arm on the underside.

In this latter embodiment, the support device in its entirely is of course displaced slightly in a horizontal direction when the adjustment angle of the arm is changed.

The support device is likewise displaced in its entirety when the adjustment angle of the arm is changed in an embodiment wherein the arm comprises a concavely formed part on the underside, with which part the arm is arranged for free movement over a point of suspension such that the center of gravity of the support device lies vertically beneath the tilting point in any position of the arm.

In this latter embodiment, the arm is for example rigid and the concavely formed part comprises at least partially a circular arc in vertical longitudinal section.

In a variation of this latter embodiment, the arm consists at least partially of flexible material and in longitudinal section, the concavely formed part has at least partially an egg shape, wherein the head of the egg is directed towards the body for positioning. The point of suspension in such a support device comprises by way of example a wheel rotatable around a shaft standing perpendicularly of the surface of the support device, on which wheel the concavely formed part rests.

The stability of a balanced arm in a support device with such a concavely formed part is increased when the concavely formed part is provided with means which increase the friction coefficient between that part and the point of suspension.

The support device according to the invention makes available a multi-functional device with which a body for positioning can be placed at a determined position in a simple, rapid and self-balancing manner. The invention not only provides a self-balancing arm with a counterweight with which corrections are made for a flexible bending of the arm, but also enables the use of materials for the arm which are eminently flexible, such as carbon fiber, glass-fiber or aluminium.

The multi-functionality of a support arm according to the invention is increased still further with a support device wherein the body for positioning comprises a second support device in accordance with the invention.

Use of a support device according to this latter embodiment, for example for the purpose of light fittings, enables the suspension from a self-adjusting support device of a second self-adjusting support device, to the end of which is fixed a lamp. The two-fold application of the support device enables displacing of the lamp over a relatively great distance both in vertical and in horizontal directions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be further elucidated in the following on the basis of embodiments and with reference to the drawings which are given by way of illustration only, and thus are not limitative of the present invention, and wherein;

In the drawing in perspective view.

FIGS. 6a, 6b and 6c show a support device with flexible arm resting on a cross-sectionally circular base;

FIGS. 7a, 7b and 7c a support device with flexible arm suspended for free displacement over a and;

FIG. 8 shows a support device with flexible arm which is supported by a stand and to which is fixed a second support device with a flexible arm and a lighting source.

DESCRIPTION OF THE PREFERRED EMBODIMENTS

Figure 1B:
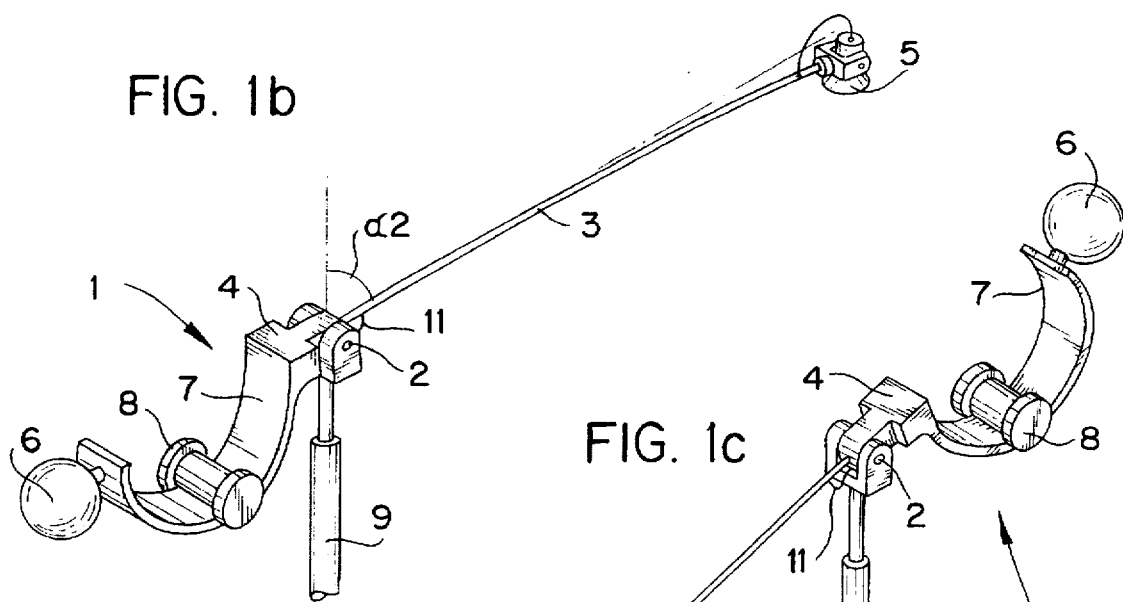
FIGS. 1a, 1b and 1c show an arm of flexible material supported in its tilting point by a stand.
Figure 1C:
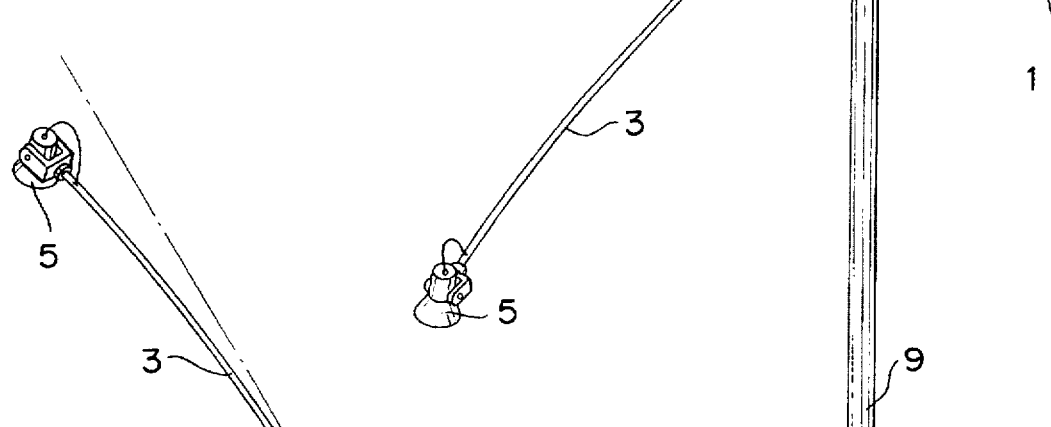
Figure 1A:
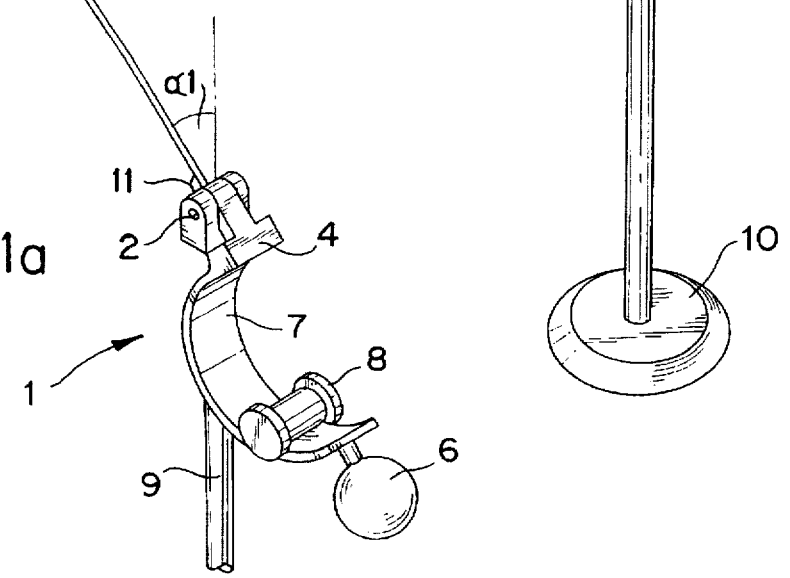
Figure 2B:
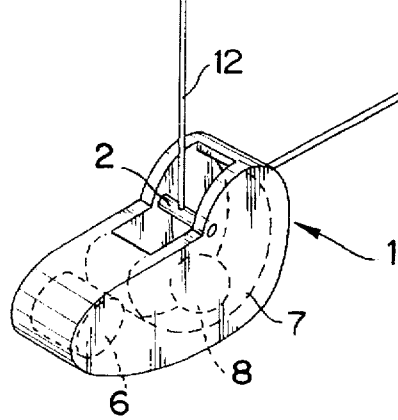
FIGS. 2a, 2b and 2c show the variant of the support device of FIG. 1 suspended in its tilting point from a suspension device.
Figure 2C:
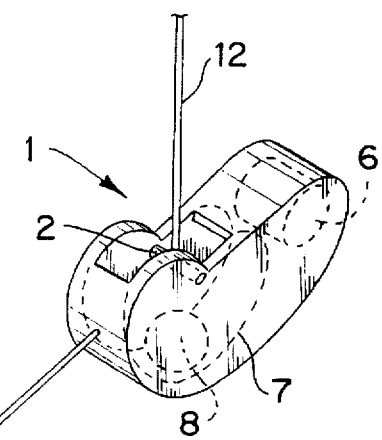
Figure 2A:
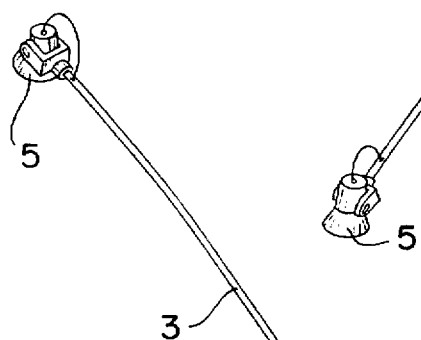
Figure 2A:
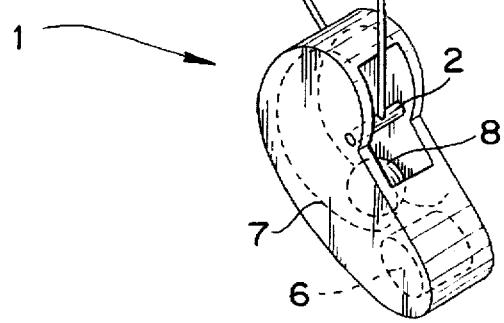

FIG. 1 show a support device 1 with different adjustments of the arm 3, 4 in the FIGS. 1a, 1b and 1c. The device 1 comprises an arm adjustable around a tilting point 2 and consisting of a flexible part 3 and a rigid part 4. A lamp 5 hangs on the end of the flexible part 3, and arranged on the rigid part 4 is a counterweight which comprises a holder 7 that is ovoid in longitudinal section and the mass of which is represented by a solid mass 6 drawn at the head of the egg 7. The counterweight further comprises a mass 8 freely movable along the inner side 7. The FIG. 1c further shows a stand 9, a base 10 and an electrical lead 11 for the lamp 5.

In FIG. 1a, the lamp 5 is set in a relatively high position. The arm 3, 4 makes an acute angle $\alpha_1$ with the normal, the mass 8 rests at a point in the holder 7 relatively far removed from the tilting point 2. Under the weight of the lamp 5 the flexible part 3 of the arm bends, the dashed line in the figure indicating the position of the arm in the absence of bending. When the arm 3, 4 is placed horizontally (FIG. 1b, the angle $\alpha_2$ then amounts to 90°) the mass 8 rolls along the holder 7 to a position of equilibrium closer to the tilting point 2. When lowered still further (FIG. 1c, the angle $\alpha_3$ is now larger than 90°) the mass 8 rolls to a point still closer to the tilting point 2.

FIG. 2 shows a support device as in FIG. 1, wherein the tilting point 2 is displaced along the arm in the direction of the holder 7 due to a larger solid mass 6 of the counterweight. In this embodiment the tilting point 2 lies in fact in the foremost part of the holder 7 and the support device 1 is suspended from a suspension device 12.

The action of this support device is analogous to that of FIG. 1: the higher the position of the lamp 5, the further removed the movable mass 8 is situated at a point along the holder 7.

Figure 3:
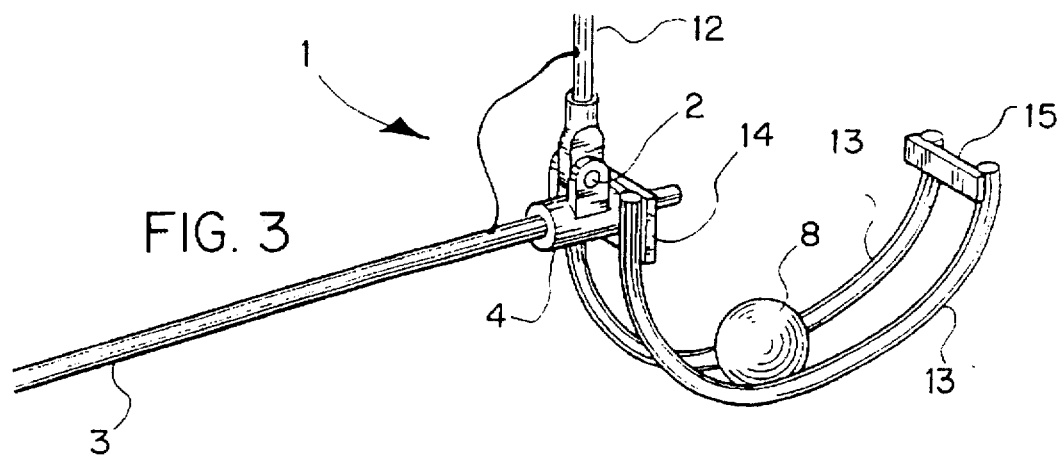
FIG. 3 shows an example of a counterweight of the support device of FIGS. 1 and 2.

FIG. 3 shows a detail of a support device 1 which is suspended from a suspension device 12 and has a flexible arm part 3 and a holder of ovoid longitudinal section which is formed by two parallel rails 13, connected by transverse connections 14 and 15, between which a spherical mass 8 is freely displaceable.

Figure 4:
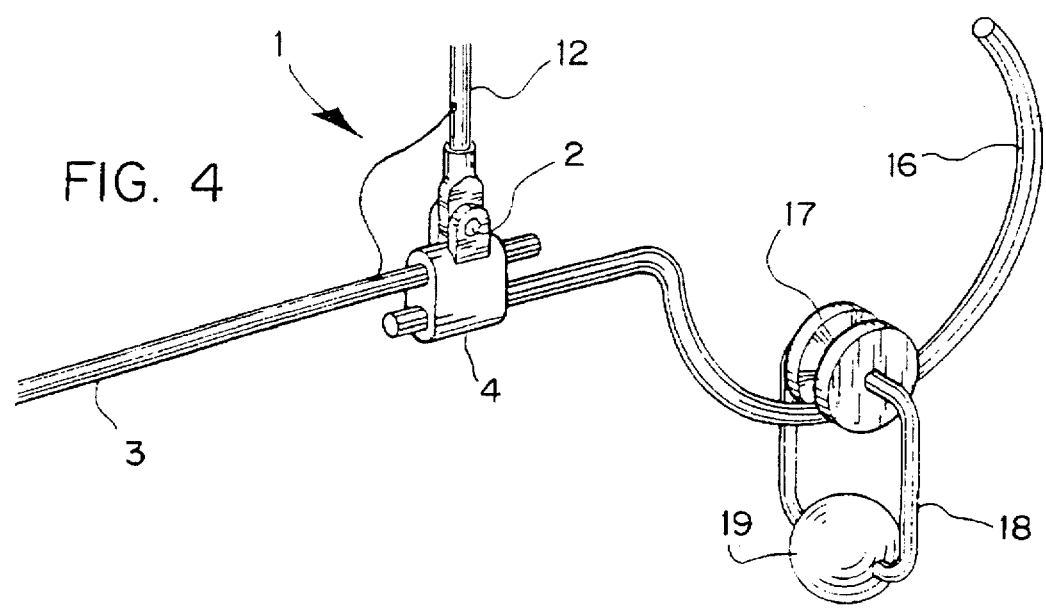
FIG. 4 shows the holder with a load of a counterweight for a rigid arm carried by a wheel.

FIG. 4 shows a side view of a part of a support device 1 with a holder 16 which is circular in longitudinal section and on the inner side of which a wheel 17 is arranged for free displacement, and a load 19 is fixed to the wheel with a cable 18. The arm parts on either side of the tilting point 2 are rigid in this embodiment.

When the arm 4 is turned round the tilting point 2, the wheel 17, which is received for instance in a rail (not shown), travels to the new equilibrium point associated with the adjustment position of the arm. The load 19 lowers the center of gravity of the total support device relative to the tilting point 2 and thereby contributes to an increase in the stability of the device in equilibrium. In addition the mass 19 in this embodiment can fulfil a function from an aesthetic viewpoint.

Figure 5:
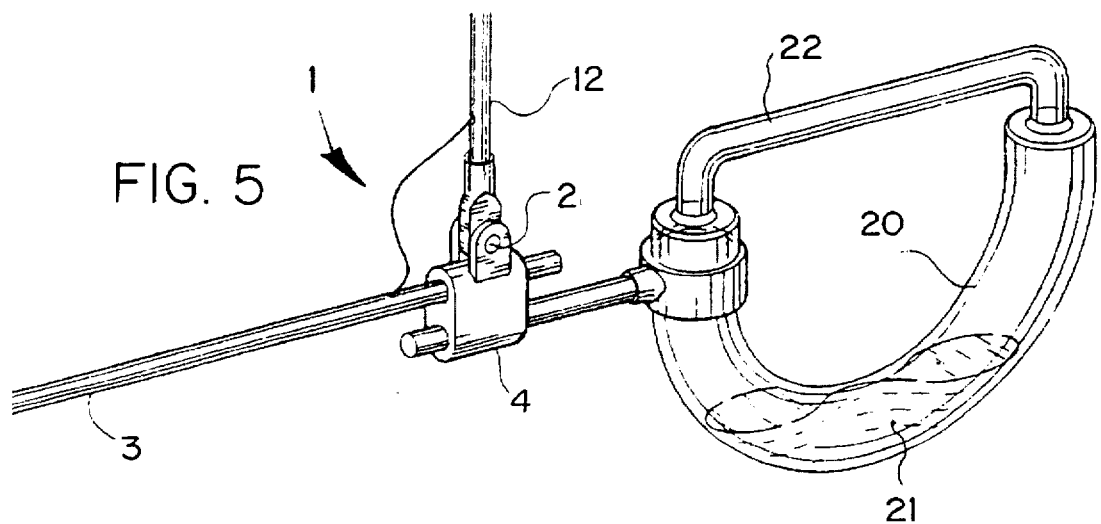
FIG. 5 shows the circular tube of a counterweight for a rigid arm filled with a liquid.

FIG. 5 shows a side view of a part of a support device with rigid arm 4, suspended in a tilting point 2 and provided with a holder substantially circular in longitudinal section. The holder comprises a tube 20, the walls of which comprise in vertical longitudinal section two concentric semi-circular arcs. A connecting tube 22 mutually connects the ends of the tube 20 so that a liquid 21 closed off from the outside can move freely in tube 20. The higher or lower the body for positioning (not drawn) is adjusted on arm 4, the closer to or further from the tilting point 2 the liquid 21 will flow.

FIG. 6 shows once again in side view a support device 1 with flexible arm 3 and a holder 7 that is ovoid in longitudinal section. The support device rests on a base 23 which in a longitudinal section through the support device comprises a semi-circular arc 23, the middle point of which coincides with the position the tilting point would have if the support device were suspended. Due to the presence of the base 23, the tilting point is moved downward and is formed by the point of contact of a horizontal tangent on said arc 23. The support device 1 rests on a column 25 with horizontal upper surface 24.

FIG. 7 shows in side view a support device 1 bearing a lamp 5 in three different positions (FIGS. 7a, 7b and 7c, respectively). The arm comprises a flexible part 3 to which the lamp 5 is fixed, a rigid part 4 with a solid mass 6 which functions as counterweight and a part 26 that is ovoid in longitudinal section and concavely formed on the underside and which connects both arm parts 3 and 4. The head 27 of the egg is oriented toward the lamp 5. The support device 1 is supported on the inside of the concave part 26 by one or more wheels 28 placed on a shaft on the upper part of pillar 9. When the lamp 5 is tilted, for instance from the position shown in FIG. 7a to the position in FIG. 7b, the support device is also displaced in lengthwise direction relative to the tilting point formed by the shaft of the wheels 28, wherein the inner side of the concave part 26 rolls over the wheels 28. To increase the stability, the inner side of the concave part 26 can, for example, be covered with a rubber layer and the rotation of the wheels 28 can be accompanied by some (slight) friction.

Finally, FIG. 8 shows a "cascade" of support devices according to the invention, wherein a first support device 1 disposed on a stand 9 comprises a second support device 1' suspended on a bracket 30 in a suspension point 29. This second support device 1' comprises another arm suspended in a tilting point 31 and having a rigid part 32 and a flexible part 33, to the extremity of which yet another lamp 5 is fixed. The figure further shows a solid mass 34 of the second counterweight, a second holder 35 that is ovoid in longitudinal section and a displaceable mass 36 of the second counterweight. The second adjustment position shown in dashed lines, wherein the adjustment of both support devices is changed, illustrates the great range of this cascade support device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An adjustable support device for a body, the support device comprising:
    a tilting point;
    an adjustable arm supported at the tilting point, at least a portion of the arm being made of flexible material and adapted to be attached to the body at a first end and a length of the arm extending from the tilting point to the first end thereof being a fixed length, the arm being movable about the tilting point; and a counterweight attached to a second end of the arm, the first and second ends of the arm being on opposite sides of the tilting point, the counterweight including at least one holder in which at least one mass is movably mounted, the at least one holder being attached to the arm and being movable therewith, the at least one mass being movable along a length of the at least one holder to be movable relative to the adjustable arm and to the at least one holder such that a center of gravity of the support device with the body and the tilting point lie on a generally vertical line in any position of the arm, wherein the holder in longitudinal section has at least a partially oval shape, a head of the oval shape being oriented outwardly.

2. The adjustable support device as claimed in claim 1, wherein the flexible material comprises at least one of carbon-fiber, glass-fiber and aluminum.

3. The adjustable support device as claimed in claim 1, wherein the center of gravity of the support device lies beneath the tilting point in any position of the arm.

4. The adjustable support device as claimed in claim 1, wherein in a section in lengthwise direction, the tilting point coincides with a point of contact of a horizontal tangent on holder.

5. The adjustable support device as claimed in claim 1, wherein the at least one mass has a generally circular cross-section.

6. The adjustable support device as claimed in claim 1, further comprising means for increasing frictional coefficient between the at least one mass and the at least one holder.

7. The adjustable support device as claimed in claim 1, wherein the tilting point coincides with a point of contact of a horizontal tangent on a base that is connected to an underside of the arm, the base having at least a partially circular shape in longitudinal section at the location of the tilting point.

8. The adjustable support device as claimed in claim 1, further comprising a second support device, the body being mounted on the second support device and the second support device being movably mounted on the adjustable arm.

9. The adjustable support device as claimed in claim 8, wherein the second support device comprises a rigid part and a flexible part, the body being mounted on the flexible part of the second support device and the rigid part having a second counterweight mounted thereon, the second counterweight having at least one second holder with at least one second mass, the at least one second mass being movable along the at least one second holder, the second support device being connected to the arm by a bracket, the bracket being attached at or near an end of the arm.

10. The adjustable support device as claimed in 1, wherein the arm is bent at most in one direction.

11. The adjustable support device as claimed in 1, wherein the arm is generally straight.

12. The adjustable support device as claimed in claim 1, wherein the arm is pivoted about the tilting point and wherein the body is moved along an arcuate path during movement of the arm.

13. A combination of an adjustable support device and a body, the support device comprising:

a tilting point;

an adjustable arm supported at a tilting point, at least a portion of the arm being made of a flexible material and being attached to the body at a first end, a length of the arm extending from the tilting point to the first end thereof being a fixed length;

a counterweight operatively attached to a second end of the arm on, the first and second ends of the arm being on opposite sides of the tilting point; and at least one holder in which at least one mass is movably mounted, the holder being mounted on the arm and the holder in longitudinal section having a partially oval shape with a head of the oval shape of the holder being oriented outwardly, the at least one mass being movable along a length of the at least one holder such that a center of gravity of the support device with the body and the tilting point lie on a generally vertical line in any position of the arm.

14. The adjustable support device as claimed in claim 13, further comprising means on the holder for increasing frictional coefficient between the mass and the holder.

15. The adjustable support device as claimed in claim 13, wherein the body attached to the adjustable arm is a light fitting.

16. The adjustable support device as claimed in claim 13, wherein the arm has a flexible part and a rigid part, the at least one holder being mounted between the flexible and rigid parts of the arm, the counterweight being mounted on the rigid part of the arm and the tilting point passing through the at least one mass.

17. The adjustable support device as claimed in claim 16, wherein the at least one mass is a wheel which slides over an undersurface of the at least one holder.

18. The adjustable support device as claimed in claim 13, wherein the at least one mass is a roller which slides along an upper surface of the at least one holder and the counterweight is operatively attached to the arm through the at least one holder.

19. The adjustable support device as claimed in claim 13, further comprising a second support device, the body being mounted on the second support device and the second support device being movably mounted on the adjustable arm.

* * * * *